US008930685B2

(12) United States Patent
Fontignie et al.

(10) Patent No.: US 8,930,685 B2
(45) Date of Patent: Jan. 6, 2015

(54) DEPLOYMENT OF A SOFTWARE IMAGE ON MULTIPLE TARGETS WITH STREAMING TECHNIQUE

(71) Applicant: International Business Machines Corporation, Armonk, NY (US)

(72) Inventors: Jacques Fontignie, Vernier (CH); Claudio Marinelli, Aprilia (IT); Bernardo Pastorelli, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/663,239

(22) Filed: Oct. 29, 2012

(65) Prior Publication Data

US 2013/0151834 A1    Jun. 13, 2013

(30) Foreign Application Priority Data

Dec. 13, 2011  (EP) ..................................... 11193151

(51) Int. Cl.
*G06F 9/44*    (2006.01)
*G06F 9/445*    (2006.01)

(52) U.S. Cl.
CPC ............... *G06F 9/4416* (2013.01); *G06F 8/63* (2013.01)
USPC .......................................................... 713/2

(58) Field of Classification Search
CPC ............ G06F 9/4416; G06F 8/60; G06F 8/63
See application file for complete search history.

(56) References Cited

U.S. PATENT DOCUMENTS 7,120,558 B2 * 10/2006 McIntyre et al. ............. 702/183

| 7,496,911 | B2 * | 2/2009 | Rowley et al. ................. 717/174 |
| 7,788,713 | B2 | 8/2010 | Grobman et al. ............... 726/12 |
| 2004/0268345 | A1 | 12/2004 | Lodwick et al. | |
| 2005/0160150 | A1 | 7/2005 | Kao | |
| 2008/0256219 | A1 * | 10/2008 | Zhang et al. .................. 709/222 |
| 2010/0037235 | A1 | 2/2010 | Larimore et al. | |
| 2011/0213687 | A1 | 9/2011 | Ferris et al. | |

(Continued)

FOREIGN PATENT DOCUMENTS

| CN | 1959643 | 5/2007 |
| CN | 102110009 | 6/2011 |
| WO | 2010141387 | 12/2010 |

OTHER PUBLICATIONS

Chieu et al., "Virtual Machines with Sharable Operating System," IBM Technical Research Report, International Business Machines Corporation, RC25196, Aug. 2011, 7 pages.

(Continued)

*Primary Examiner* — Hiep Nguyen
(74) *Attorney, Agent, or Firm* — VanLeeuwen & VanLeeuwen; Parashas T. Kalaitzis

(57) ABSTRACT

Deploying a software image from a source data-processing system on target data-processing entities of a target data-processing system, the software image including memory blocks being individually accessible, with a predefined subset of the memory blocks defining a bootstrap module. The deploying includes downloading the bootstrap module onto a main one of the target data-processing entities from the source data-processing system, booting the main target data-processing entity from the bootstrap module thereby loading a streaming driver in the bootstrap module, and serving each request of accessing a selected memory block of the software image on the main data-processing entity by the streaming driver.

9 Claims, 10 Drawing Sheets

(56) References Cited

U.S. PATENT DOCUMENTS

| | | | |
|---|---|---|---|
| 2011/0219372 A1 | 9/2011 | Agrawal et al. | 718/1 |
| 2011/0231844 A1 | 9/2011 | Ben-Shaul et al. | 718/1 |
| 2011/0264776 A1 | 10/2011 | Clerc et al. | 709/222 |
| 2012/0311564 A1* | 12/2012 | Khalid | 718/1 |
| 2013/0205293 A1* | 8/2013 | Levijarvi et al. | 717/177 |

OTHER PUBLICATIONS

Guo et al., "Datacast: A Scalable and Efficient Group Data Delivery Service for Data Centers," Microsoft Technology Report, MSR-TR-2011-76, Microsoft Corporation, Jun. 2011, 17 pages.

Nicolae et al., "Optimizing multi-deployment on clouds by means of self-adaptive prefetching," Euro-Par '11: 17th International Euro-Par Conference on Parallel Processing, Bordeaux, France, May 2011, 12 pages.

Clerc et al., "OS Streaming Deployment," Proc. $29^{th}$ IEEE Int'l Performance Computing and Communications Conf., Albuquerque, NM, "IPCCC2010," IEEE, Dec. 2010, 11 pages.

International Search Report and Written Opinion for PCT Application PCT/IB2012/056948 (filed Dec. 4, 2012), mailed Apr. 25, 2013, 11 pages.

\* cited by examiner

DEPLOYMENT OF A SOFTWARE IMAGE ON MULTIPLE TARGETS WITH STREAMING TECHNIQUE

RELATED APPLICATIONS

This application is based on and claims the benefit of priority from European Patent Application EP 11193151.5, filed Dec. 13, 2011.

BACKGROUND

The present invention relates to the data-processing field. More specifically, this present invention relates to the deployment of software images.

Software images are a key feature of modern data-processing systems. Generally speaking, a software image is a structure that encapsulates files residing on a (physical or virtual) data-processing machine—for example, storing its operating system, application programs, and/or data. The software images are suitable to be moved, copied, replicated, protected and profiled in a very simple way. These advantages are clearly perceived when the software images are used in virtual machines (i.e., emulations by software of physical machines); indeed, in this case any kind of virtual machine may be provisioned on-demand by simply creating a new virtual machine and then booting it from a desired software image. For example, this is particularly useful in cloud computing (wherein multiple data-processing services are provided to client computers being completely agnostic of their physical implementation).

The software images are generally stored in a source data-processing system (for example, a source server), from which they are deployed onto multiple target data-processing entities (for example, target virtual machines hosted on a target server). The target server is generally remote from the source server; therefore, the deployment of the software images on its target virtual machines is a relatively long process.

In order to tackle this problem, it has also been proposed to use some target virtual machines for providing the software image (or at least a portion thereof) to other target virtual machines—for example, as described in US-A-2011/0231844, U.S. Pat. No. 7,788,713 and US-A-2011/0219372 (the entire disclosures of which are herein incorporated by reference). Moreover, it is also possible to cache the software image along a network path from the source server to the target servers for its access by other target servers—for example, as described in "Datacast: A Scalable and Efficient Group Data Delivery Service for Data Centers, Chuanxiong Guo et al. (Microsoft Ltd.), Microsoft Technology report (MSR-TR-2011-76)" (the entire disclosure of which is herein incorporated by reference).

In any case, each new target virtual machine is available only after the full software image has been deployed thereon (in general, after some hours).

Alternatively, instead of deploying the whole software image on each target virtual machine, it is possible to download only memory blocks thereof on-demand; the downloaded memory blocks may also be saved temporally into a local cache and possibly pre-fetched for their next use. Particularly, as described in "Optimizing Multi-Deployment On Clouds By Means Of Self-Adaptive Prefetching," Nicolae, Bogdan et al; Cappello, Franck et al., Lecture Notes in Computer Science (including subseries Lecture Notes in Artificial Intelligence and Lecture Notes in Bioinformatics), v 6852 LNCS, n PART 1, p 503-513, 2011, Euro-Par 2011 Parallel Processing—17th International Conference, Proceedings, Springer Verlag" (the entire disclosure of which is herein incorporated by reference), when multiple instances of the same software image are used concurrently on the same target server, their memory blocks may be pre-fetched by the slower target virtual machines following a previous access pattern of the faster target virtual machines (since their access patterns should be very similar).

However, in the above-described technique the memory blocks of the software image are downloaded onto each target virtual machine only for their immediate use. Therefore, these memory blocks disappear after they have been used, and in any case after the target virtual machine is turned off, so that they have to be downloaded again for any next use thereof (with the target server that can never be disconnected from the source server). Even when the memory blocks are stored into the local cache (possibly with their pre-fetching), only few of them remain in the local cache for their re-use (in any case, with the least recently used memory blocks in the local cache that are ultimately evicted for storing new memory blocks).

BRIEF SUMMARY

In its general terms, the solution according to one or more embodiments of the present invention is based on the idea of deploying the software image by retrieving its memory blocks from where they have already been downloaded.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a system and product for deploying a software image from a source data-processing system on a plurality of target data-processing entities of a target data-processing system, wherein one of them is a main target data-processing entity (wherein memory blocks of the software image are downloaded from the source data-processing system and stored locally at their first access) and the other ones are secondary target data-processing entities (wherein memory blocks of the software image are retrieved from the main target data-processing entity and stored locally at their first access).

A further aspect of the solution according to an embodiment of the invention provides a corresponding computer program.

A still further aspect of the solution according to an embodiment of the invention provides a corresponding computer program product.

A different aspect of the solution according to an embodiment of the invention provides a corresponding data-processing system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation).

FIG. 1 shows a pictorial representation of a deployment infrastructure that may be used to practice the solution according to an embodiment of the invention, FIG. 2A-FIG. 2I show a conceptual representation of an application of the solution according to an embodiment of the invention, FIG. 3 shows a block diagram of the main software modules that may be used to implement the solution according to an embodiment of the invention, and FIG. 4A-FIG. 4E show an activity diagram describing the flow of activities relating to an implementation of the solution according to an embodiment of the invention.

DETAILED DESCRIPTION

Figure 1:
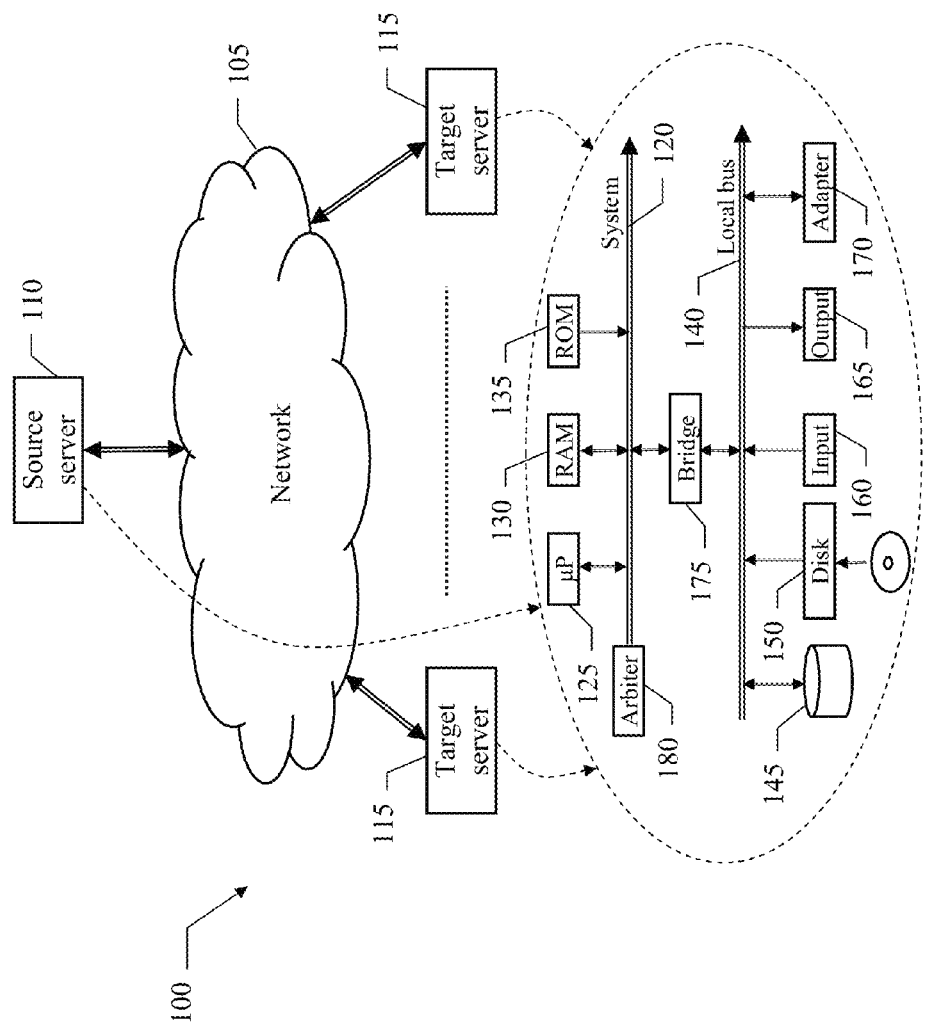

With reference in particular to the FIG. 1, a pictorial representation is shown of a deployment infrastructure 100 that may be used to practice the solution according to an embodiment of the invention.

The deployment infrastructure 100 has a distributed architecture, which is based on a network 105—for example, a Local Area Network (LAN). Multiple data-processing systems (for example, server computers) are connected one to another through the network 105. Particularly, a source server computer (or simply source server) 110 controls the deployment of software images (for example, each one comprising an operating system and several application programs) on one or more target server computers (or simply target servers) 115.

Each (source or target) server 110,115 comprises several units that are connected in parallel to a system bus 120. In detail, one or more microprocessors (μP) 125 control operation of the server 110,115; a RAM 130 is used as a working memory by the microprocessors 115, and a ROM 135 stores basic code for a bootstrap of the server 110,115. Several peripheral units are clustered around a local bus 140 (by means of respective interfaces). Particularly, a mass memory comprises one or more hard disks 145 and drives 150 for reading/writing optical disks 155. Moreover, the server 110, 115 comprises input units 160 (for example, a keyboard and a mouse), and output units 165 (for example, a monitor and a printer). A network adapter 170 is used to connect the server 110,115 to the network 105. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

A conceptual representation of an application of the solution according to an embodiment of the invention is shown in the FIG. 2A-FIG. 2I.

Figure 2A:
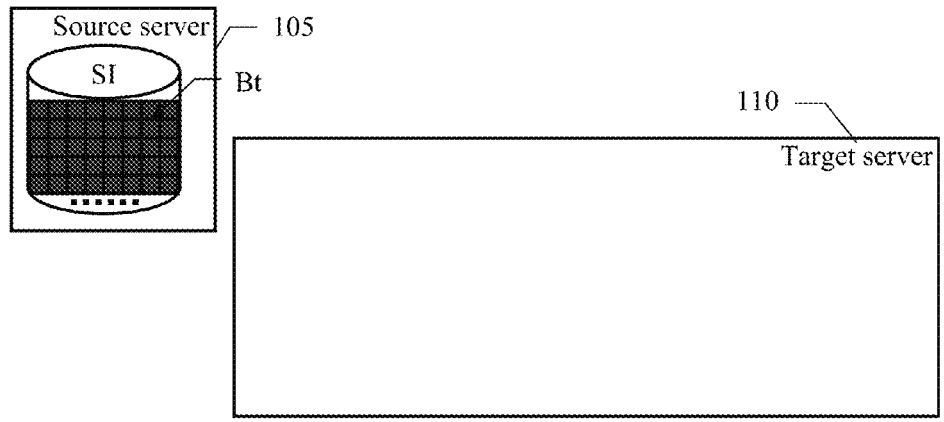

Starting from the FIG. 2A, a generic software image to be deployed from the source server 105 on multiple target virtual machines hosted on one of the target servers 110 is denoted with the reference SI.

The software mage SI comprises a plurality of memory blocks, each one of them being individually accessible (for reading and/or writing); the memory blocks may include any kind of information, such as one or more sectors, files, libraries, directories, combinations or portions thereof (for example, each one consisting of 520 bytes). A subset of the memory blocks defines a bootstrap module Bt, which comprises the memory blocks (at their correct locations, even not adjacent one to another) that are needed to boot the target virtual machines up to load a streaming driver (described in the following).

Figure 2B:
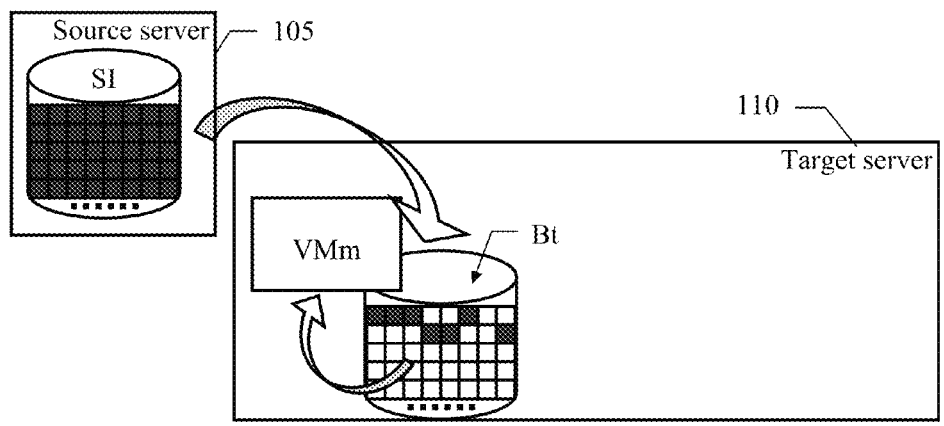

Moving to the FIG. 2B, a main one of the target virtual machines (denoted as main virtual machine VMm) is selected for the deployment of the software image SI (for example, a first target virtual machine that is created on the target server 110 for a first deployment of the software image SI thereon). The bootstrap module Bt is downloaded from the source server 105 onto the main virtual machine VMm; at this point, the main virtual machine VMm is booted from the bootstrap module Bt, thereby loading the streaming driver comprised therein (not shown in the figure).

Figure 2C:
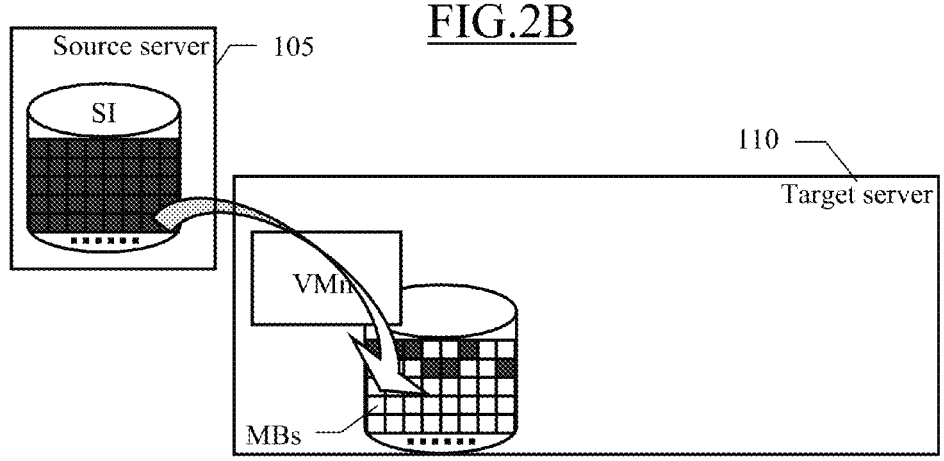

With reference to the FIG. 2C, every request of accessing a selected memory block of the software image SI (denoted with the reference MBs) during operation of the main virtual machine VMm is now served by the streaming driver. Particularly, when the memory block MBs is requested for the first time on the main virtual machine VMm the streaming driver downloads the memory block MBs from the source server 105 and stores it into the main virtual machine VMm.

Figure 2D:
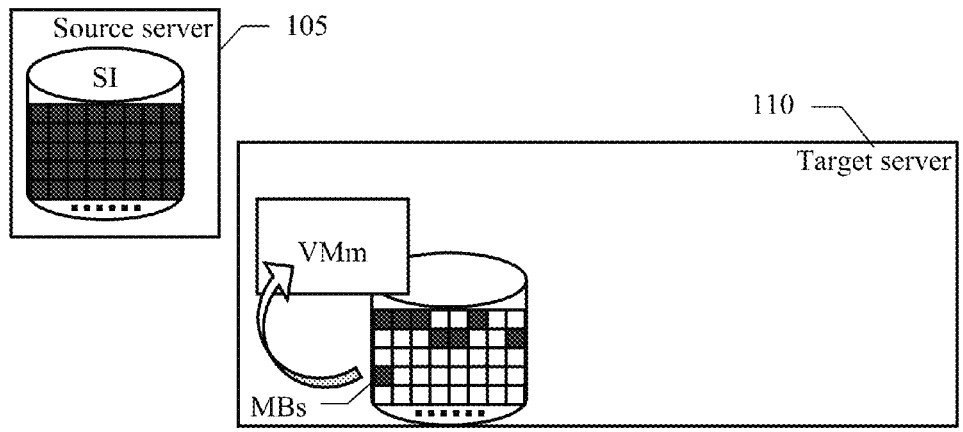

Otherwise, as shown in the FIG. 2D, when a selected memory block is accessed for a next time (like in the case of the same memory block MBs later on), it is already stored in the main virtual machine VMm; therefore, the memory block MBs may now be accessed directly in the main virtual machine VMm (without the need of downloading it again from the source server 105).

The above-described streaming technique makes each target virtual machine ready to use in a very short time—just after the bootstrap module has been downloaded thereon, even if the deployment of the rest of the software image is still in progress (for example, after 1-2 minutes for a typical size of the bootstrap module of 10-200 Mbytes); the operation of the target virtual machine is then entirely normal, irrespectively of the availability or not of the other memory blocks of the software image therein—with only a slight degradation of performance of the target virtual machine when it accesses memory blocks that are still to be downloaded from the source server. Moreover, the time required to have the main virtual machine ready to use is independent of the size of the software image. The usage of the network to download the software image on the main virtual machine also decreases over time (for example, with a logarithmic law), since more and more memory blocks of the software image will be already available in the main virtual machine once they have been accessed once.

Figure 2E:
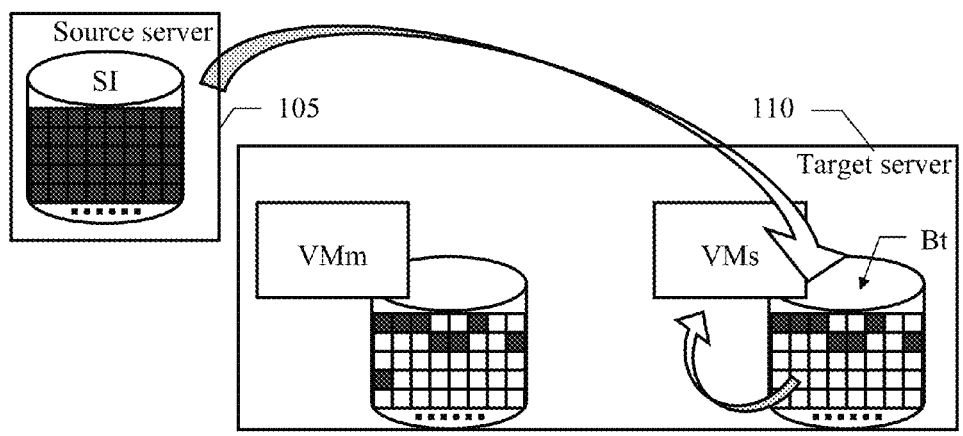

Moving to the FIG. 2E, a secondary one of the target virtual machines (denoted as secondary virtual machine VMs) is selected for the deployment of the same software image SI (for example, a next target virtual machine that is created on the target server 110 for a next deployment of the software image SI thereon). The bootstrap module Bt is provided to the secondary virtual machine VMs (for example, by downloading it again from the source server 105); as above, the secondary virtual machine VMs is booted from the bootstrap module Bt, thereby loading the streaming driver comprised therein (not shown in the figure).

Figure 2F:
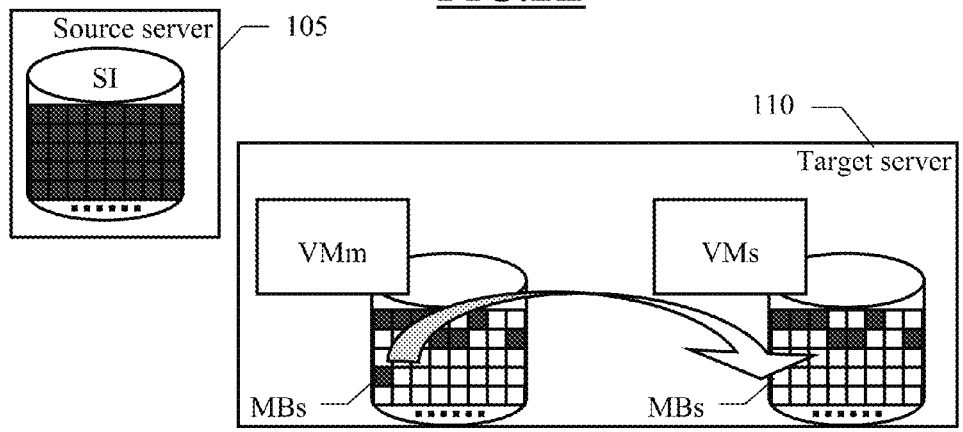

With reference to the FIG. 2F, every request of accessing a further selected memory block of the software image SI (like the same memory block MBs as above) during operation of the secondary virtual machine VMs is again served by the streaming driver.

However, in the solution according to an embodiment of the invention, when the memory block MBs is requested for the first time on the secondary virtual machine VMs the streaming driver now retrieves the memory block MBs from the main virtual machine VMm and stores it into the secondary virtual machine VMs—with the memory block MBs that is read directly from the main virtual machine VMm or downloaded from the source server 105 and stored therein as above.

Figure 2G:
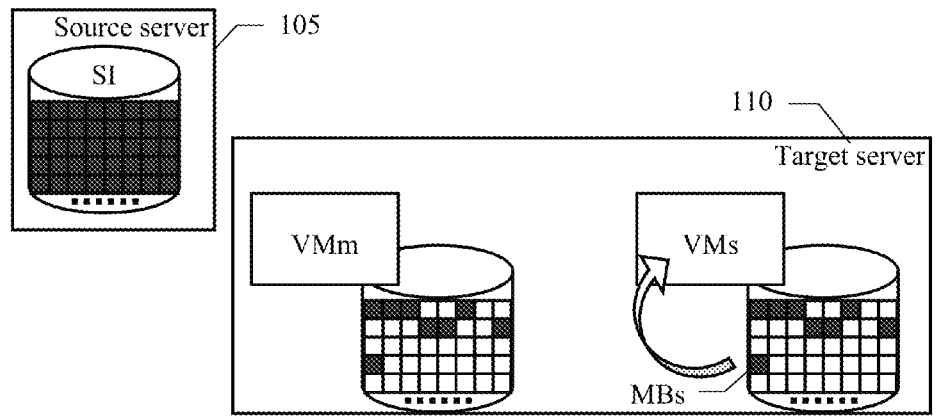

Otherwise, as shown in the FIG. 2G, when a selected memory block is accessed for a next time (like in the case of the same memory block MBs later on), it is already stored in the secondary virtual machine VMs; therefore, the memory block MBs may now be accessed directly in the secondary virtual machine VMs (without the need of retrieving it again from the main virtual machine VMm).

This strongly reduces the need of downloading the memory blocks from the source server, since each memory block is now downloaded only once onto the main virtual machine.

Moreover, being the (main and secondary) target virtual machines very similar (since based on the same software image), they are very likely to have a common behavior (i.e., to access substantially the same memory blocks in substantially the same order); therefore, the probability that the memory blocks required by each secondary virtual machine are already stored in the main virtual machine (and then they may retrieved from it directly in a fast way) is very high.

The impact of the above-described solution on the main virtual machine is negligible in most practical situations; indeed, the overhead of the main virtual machine for serving the requests from the secondary virtual machines does not substantially impair its operation (since it only requires the downloading of a few additional memory blocks not stored yet in the main virtual machine for the secondary virtual machines, which memory blocks may in any case be accessed later on by the main virtual machine itself).

It should be noted that the above-described solution has nothing to do with a standard caching technique. Indeed, in the caching technique the memory blocks are downloaded upon request and stored locally in a temporary way for their (possible) next use. Conversely, the main virtual machine downloads the memory blocks and stores them permanently therein for its own operation (so that this result is achieved automatically without necessarily having the memory blocks being requested by the secondary virtual machines); in other words, the memory blocks requested by the secondary virtual machines should be stored in the main virtual machine because they have already been accessed by the main virtual machine itself (instead, with the memory blocks that have already been accessed by each secondary virtual machine that are stored therein, and then do not need to be requested to the main virtual machine at all).

All of above improves the above-described streaming technique by strongly reducing the workload of the source server and the network traffic.

Moreover, this makes the streaming technique readily scalable (for example, to support cloud computing infrastructures).

Figure 2H:
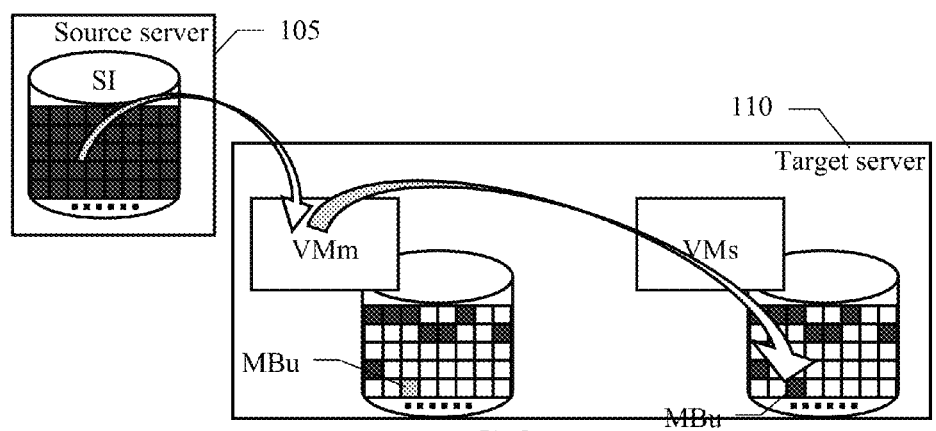
Figure 2I:
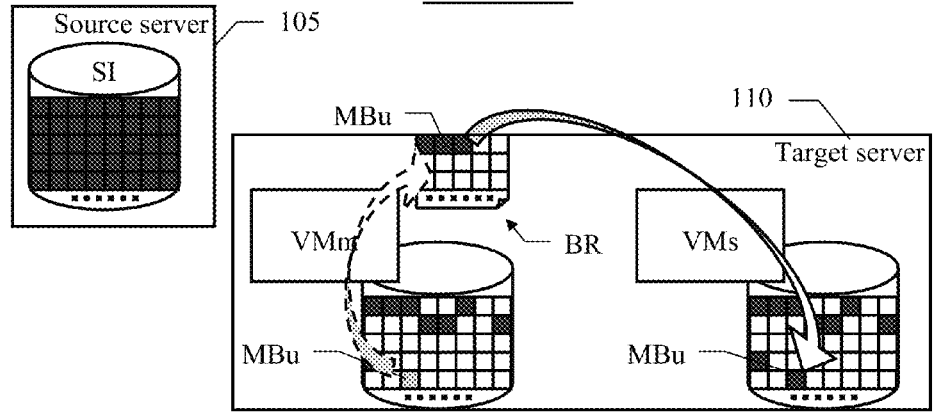

With reference now to the FIG. 2H, in a specific embodiment of the invention the memory blocks may also be updated in the main virtual machine VMm, like for the memory block MBu represented with a lighter shade in the figure. Therefore, if the (updated) memory block MBu is requested for the first time in the secondary virtual machine VMs it cannot be retrieved from the main virtual machine VMm (since the memory block MBu is different from its original version in the software image SI). In this case, the original version of the memory block MBu is downloaded from the source server 105 onto the main virtual machine VMm and returned to the secondary virtual machine VMs (without storing it into the main virtual machine VMm).

Alternatively, as shown in the FIG. 3I, the original versions of all the updated memory blocks may be saved into a dedicated block repository BR of the main virtual machine VMm. In this case, when an updated memory block is requested for the first time in the secondary virtual machine VMs (like the same memory block MBu as above), its original version may now be extracted from the block repository BR and returned to the secondary virtual machine VMs directly.

The block repository avoids the need of downloading the updated memory blocks again from the source server (with a corresponding reduction of the workload of the source server and of the network traffic, but at the cost of a corresponding waste of memory space in the main virtual machine).

Figure 3:
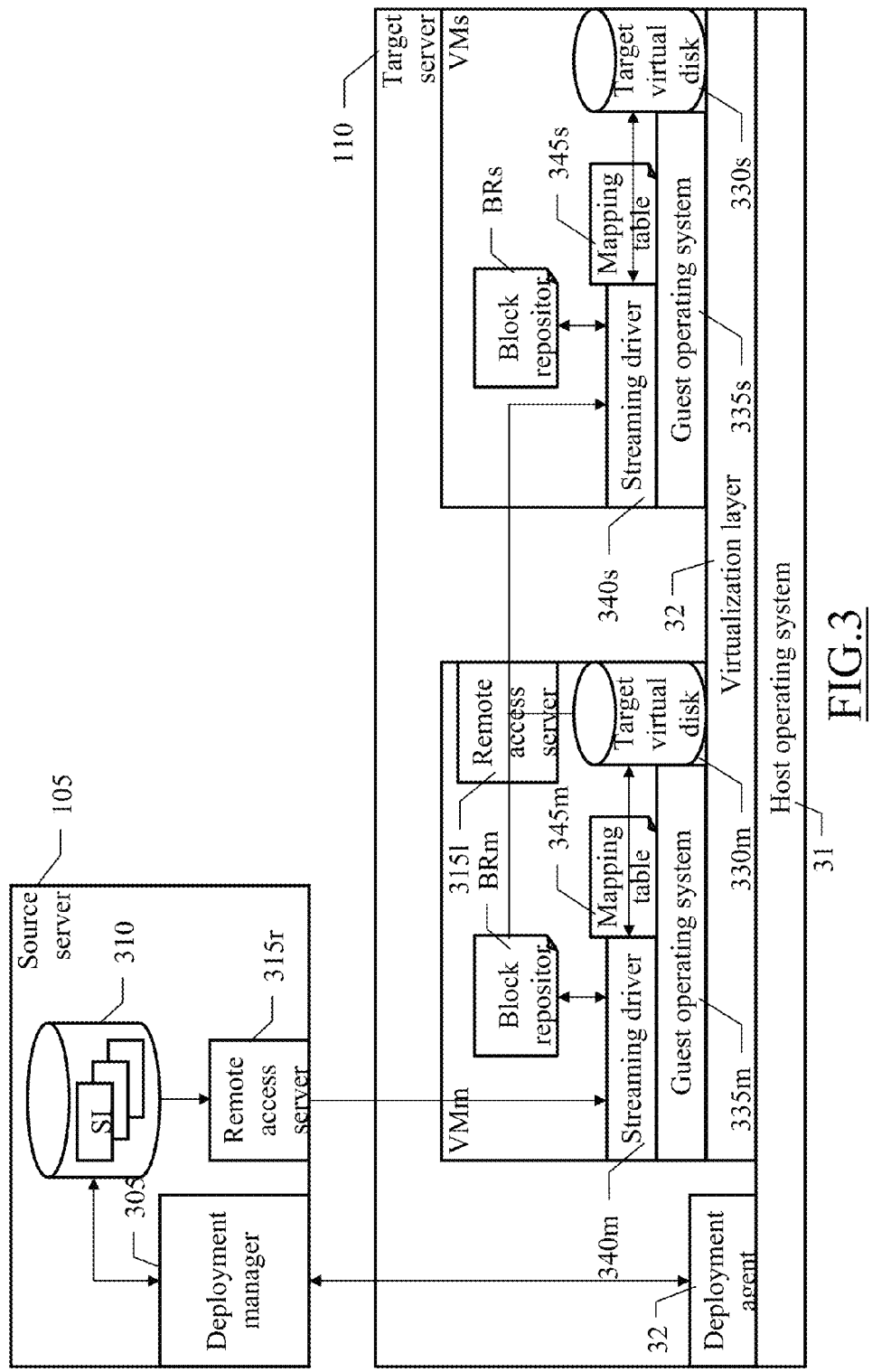
Figure 4A:
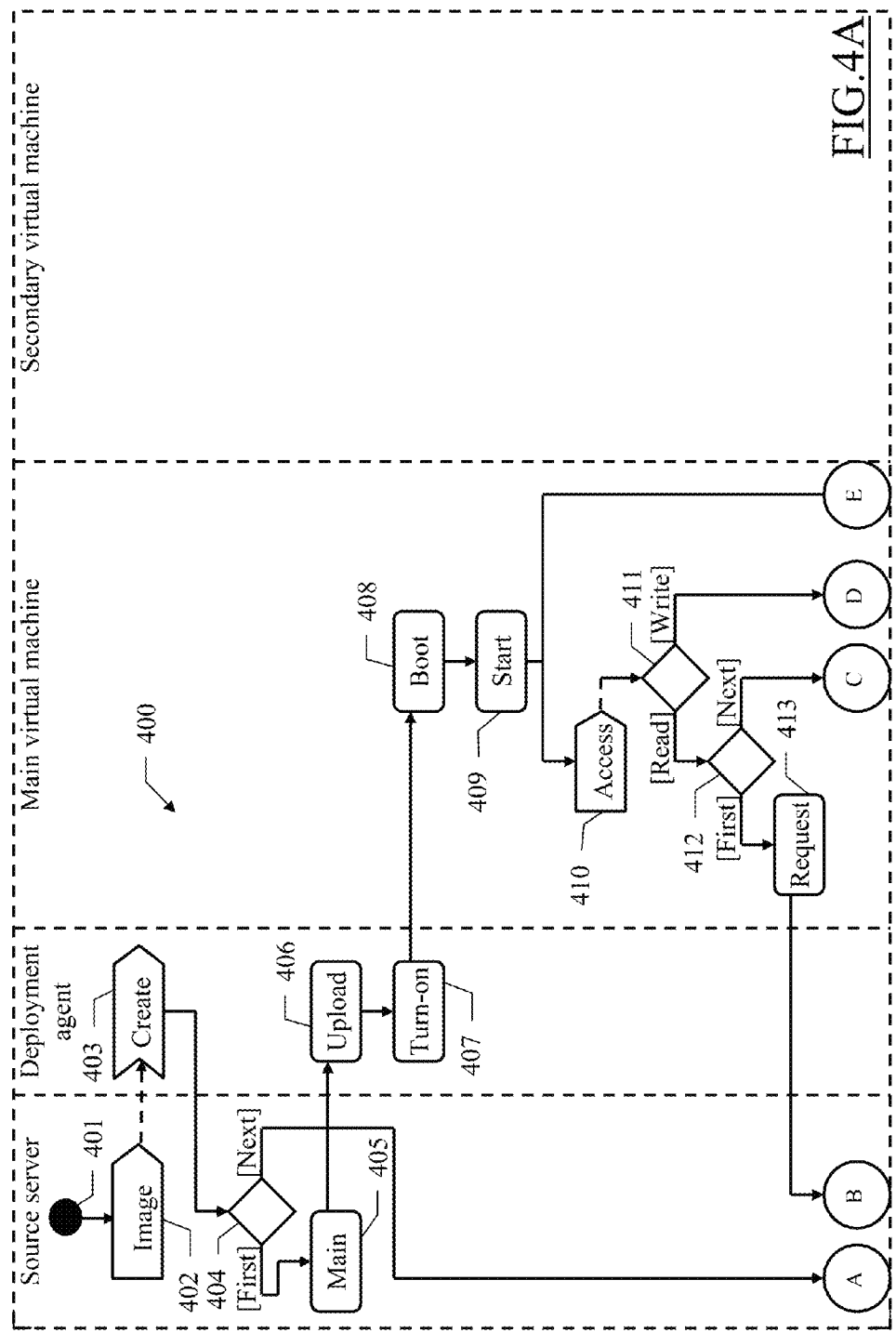
Figure 4B:
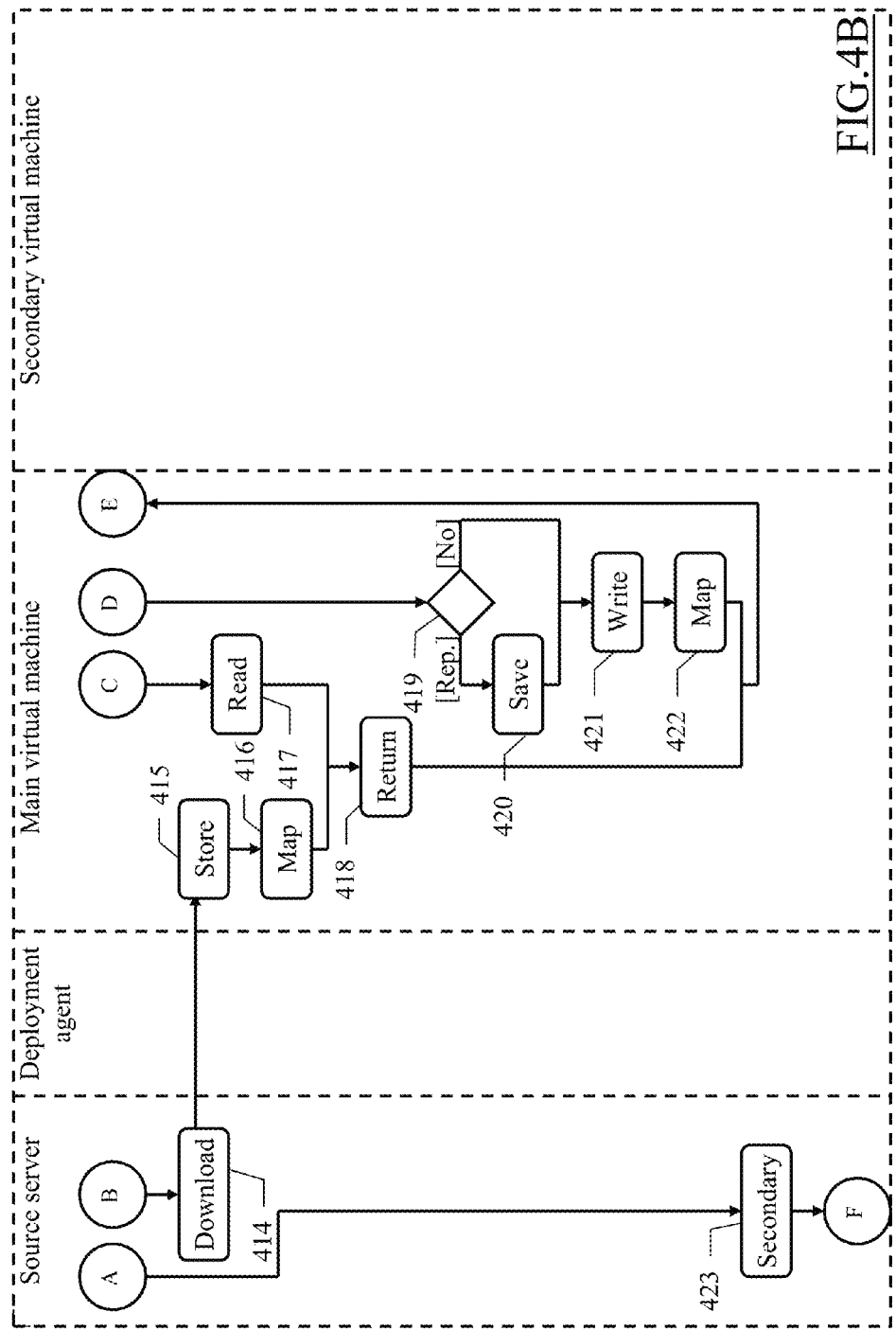
Figure 4C:
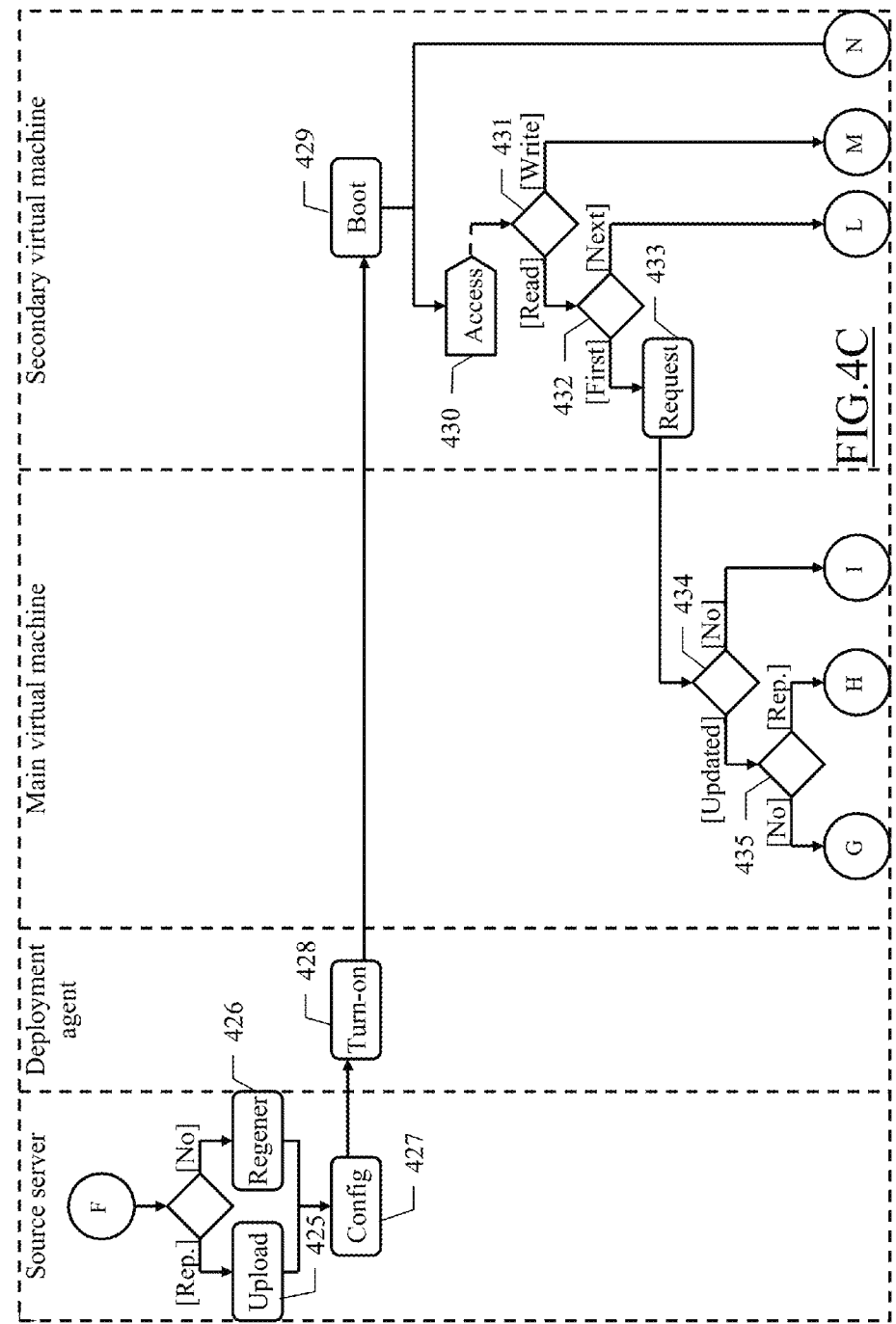
Figure 4D:
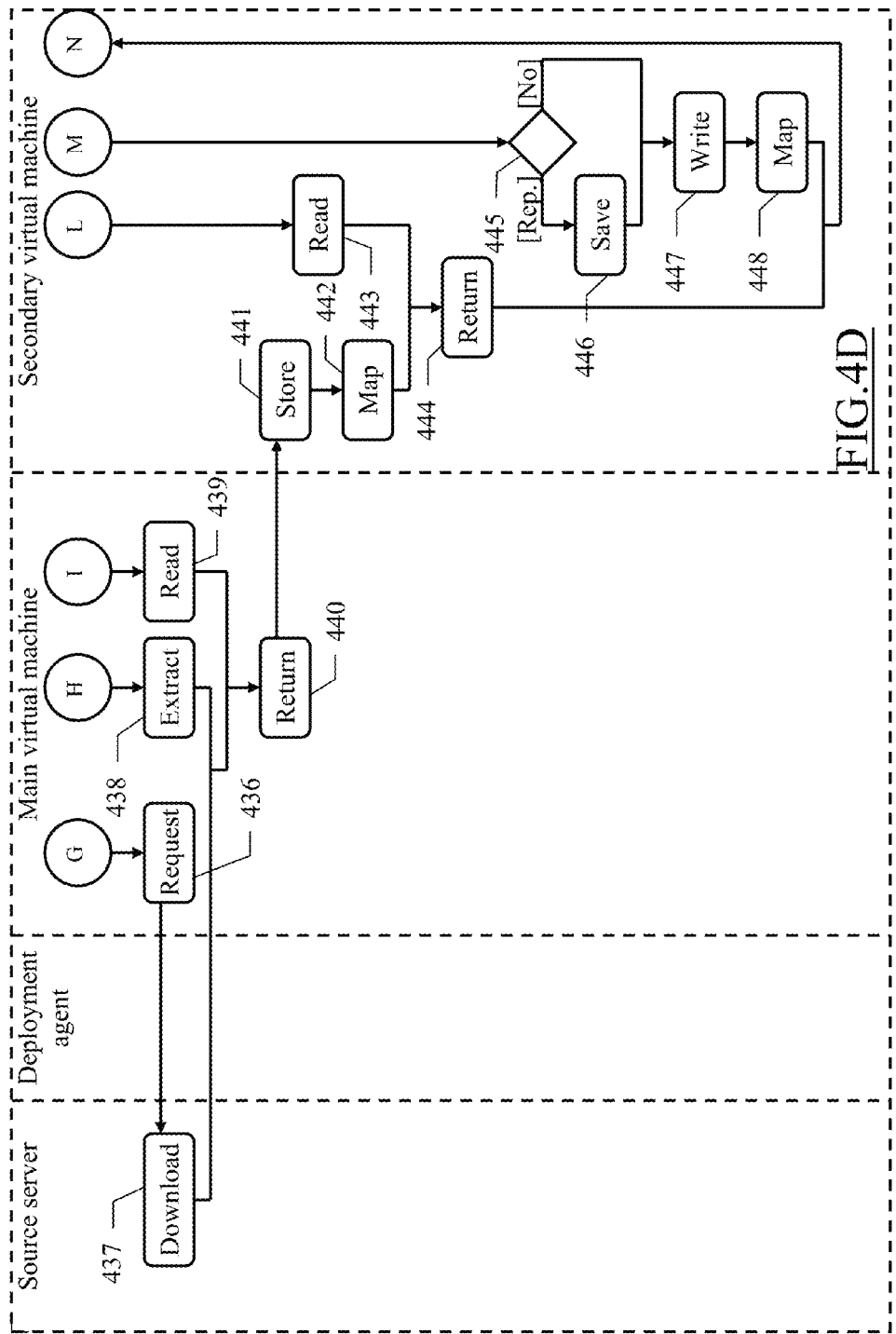
Figure 4E:
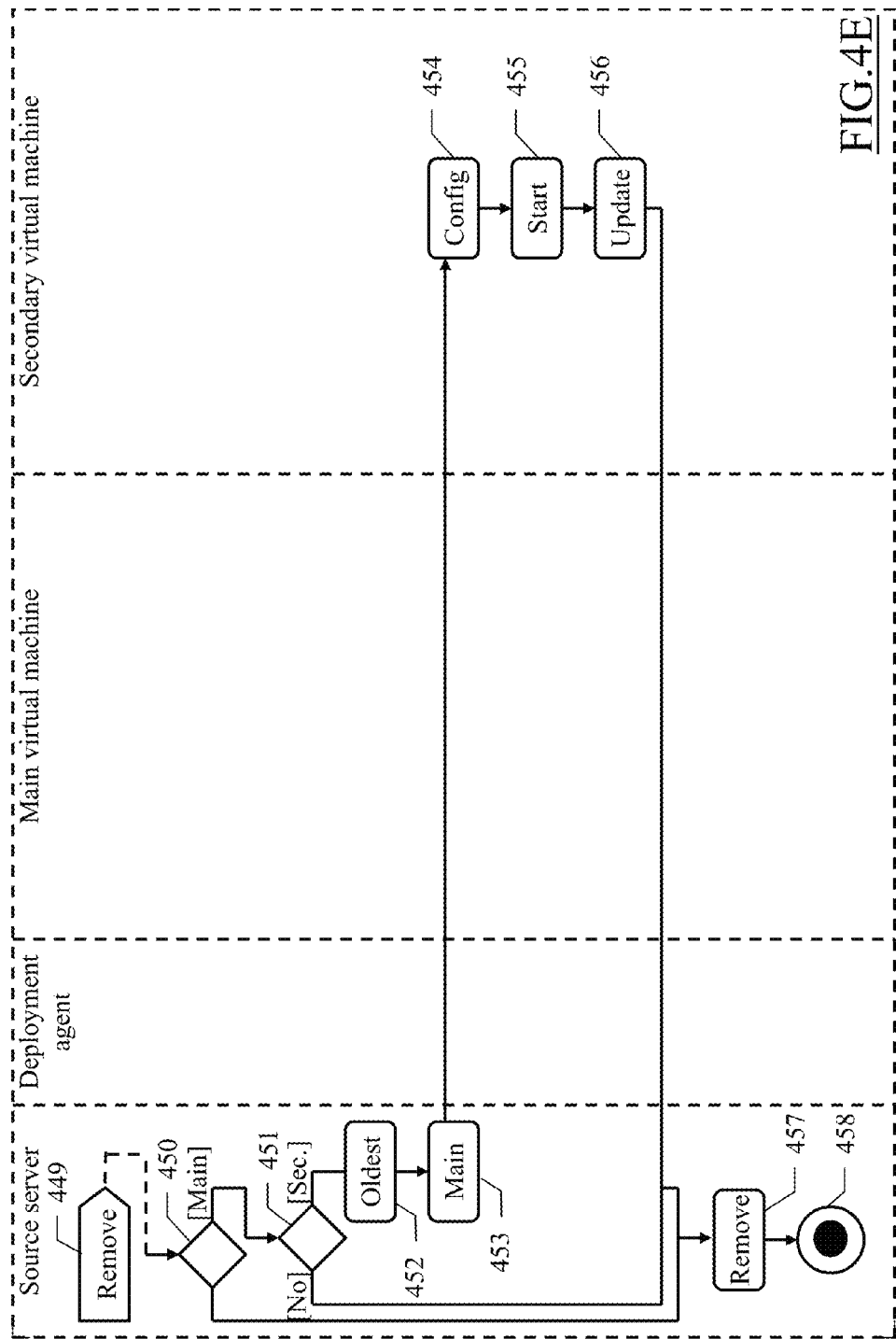

With reference now to the FIG. 3, a block diagram is shown of the main software modules that may be used to implement the solution according to an embodiment of the invention. The information (programs and data) is typically stored in the hard disk of the different server computers and loaded (at least partially) into their working memories when the programs are running. The programs are initially installed onto the hard disks, for example, from optical disks.

Particularly, the source server 105 runs a deployment manager 305—for example, the IBM Tivoli Provisioning Manager for Images (or TPMfI) of the IBM Tivoli Provisioning Manager for OS Deployment (or TPM for OSD) by IBM Corporation (trademarks of IBM Corporation); the deployment manager 305 is used to automate the deployment of software images onto the target servers 110 (only one shown in the figure); the software images are stored in a corresponding repository 310—each one by means of a single file, or more, with a predefined format (for example, conforming to the VMDK or VHD specifications). For this purpose, the source server 105 also runs a remote access server 315r (for example, based on the Internet Small Computer System Interface (iSCSI) protocol), which is used to access the software images stored in the repository 310 from the outside.

Moving to the target server 110, a host operating system 317 (directly running on its hardware) defines a software platform on top of which any other program may run. Particularly, a deployment agent 320 runs on top of the host operating system 317 for interacting with the deployment manager 305. A virtualization layer 325 also runs on top of the host operating system 317 for implementing a virtualization of the target server 110; examples of the virtualization layer 325 available on the market are VMware by VMware Inc. (trademarks of VMware Inc.) and Xen by Citrix Systems, Inc. (trademarks of Citrix Systems, Inc.). The virtualization layer 325 hosts multiple virtual machines, comprising the main virtual machine VMm and one or more secondary virtual machines VMs (only one shown in the figure) wherein the same software image SI is deployed.

Each (main and secondary) virtual machine VMm,VMs consists of an abstract structure that emulates the hardware of a physical machine (which the virtual machine VMm,VMs has sole control of). Particularly, this emulated hardware comprises a virtual disk 330m,330s (emulating a physical disk), which is used to store the memory blocks of the software image SI deployed on the virtual machine VMm,VMs (stating from the memory blocks of its bootstrap module at the beginning, with the addition of the other memory blocks as soon as they are accessed).

In each virtual machine VMm,VMs, a guest operating system 335m, 335s runs on its emulated hardware to define a software platform thereof, on top of which any other program may run (stating from its minimal functions provided by the bootstrap module at the beginning, with the addition of the other functions thereof as soon as they are used). Particularly, the main virtual machine VMm runs another remote access server 315l (for example, based on the same iSCSI protocol), which is used to access its virtual disk 330m (storing a portion of the software image SI) from the outside. In any case, each virtual machine VMm,VMs runs the corresponding streaming driver (denoted with the reference 340m, 340s) for controlling any access (for reading and/or writing) to the memory blocks of the virtual disk 330m, 330s. Particularly, the streaming driver 340m in the main virtual machine VMm is configured to interact with the remote access server 315r (to download the memory blocks of the software image SI from the source server 105); the streaming driver 335s in the secondary virtual machine VMs is instead configured to interact with the remote access server 315l (to retrieve the memory blocks of the software image SI from the main virtual machine VMm). For this purpose, the streaming driver 340m, 340s controls a mapping table 345m, 345s; for each memory block of the software image SI, the mapping table 345m, 345s comprises an accessed flag, which indicates whether the memory block has already been accessed and then it is stored in the virtual disk 330m, 330s (accessed flag asserted) or not (accessed flag deasserted).

In order to manage the memory blocks that have been updated in the virtual machine VMm,VMs (as described in detail in the following), the mapping table 345m, 345s also comprises an updated flag for each memory block; the updated flag indicates whether the memory block has been updated in the virtual machine VMm,VMs and then it is different from its original version in the software image SI (updated flag asserted) or not (updated flag deasserted). Optionally, each virtual machine VMm,VMs may also comprise the block repository (denoted with the reference BRm, BRs); for each updated memory block, the block repository BRm,BRs stores its original version (as in the software image SI) in consecutive locations thereof. In this case, for each updated memory block, the mapping table 345m, 345s also comprises an address of its original version in the block repository BRm,BRs.

An activity diagram describing the flow of activities relating to an implementation of the solution according to an embodiment of the invention is shown in the FIG. 4A-FIG. 4E. Particularly, the activity diagram represents an exemplary process that may be implemented to deploy a specific software image onto a plurality of target virtual machines with a method 400.

The method 400 begins at the black start circle 401 in the swim-lane of the source server, and then passes to block 402 wherein a system administrator selects this software image and a target server onto which the software image should be deployed through the deployment manager (for example, via a web interface thereof). In response thereto, the deployment manager instructs the deployment agent of the target server to create a corresponding target virtual machine (with a virtual disk for storing the software image) at block 403; at the same time, corresponding information is saved by the deployment manager (for example, in a deployment map wherein a record identifying this target virtual machine on the target server and the software image that will be deployed thereon is added). The flow of activity then branches at block 404 according to the number of instances of the software image that are already deployed on the target server (as indicated in the deployment map); particularly, the blocks 405-422 are executed if this is the first deployment of the software image on the target server at the moment (i.e., when no other record exits in the configuration map for the same software image on the target server), whereas the blocks 423-448 are executed if this is a next deployment of the software image on the target server at the moment (i.e., when at least another record exits in the configuration map for the same software image on the target server).

Considering now the block 405 (first deployment of the software image), the target virtual machine is set as the main virtual machine for the deployment of the software image (for example, by asserting a corresponding flag of its record in the mapping table). The deployment manager then uploads the bootstrap module onto the target server, and instructs the deployment agent to store its memory blocks into the virtual disk of the main virtual machine (in the locations where they are expected to be found during its bootstrap) at block 406. At this point, the deployment manager instructs the deployment agent to turn on the main virtual machine at block 407.

Moving to block 408 in the swim-lane of the main virtual machine, it boots normally from the bootstrap module thereby loading the corresponding portion of the guest operating system and the streaming driver with its mapping table; for example, in Microsoft Windows (trademarks of Microsoft Corp.) the bootstrap module Bt comprises a Master Boot Record (MBR), a boot sector, a bootmgr.exe file, a boot\bcd file, a system registry, a winload.exe file, and drivers specified in a system registry (comprising a remote access driver for interacting with a corresponding remote access server and the streaming driver); the mapping table of the streaming driver is initialized with the accessed flags of the memory blocks of the bootstrap module asserted and the accessed flags of the other memory blocks deasserted, and with the updated flags of all the memory blocks deasserted. The streaming driver overrides a standard file-system driver of the guest operating system (which sees the whole software image as it was stored in the virtual disk) for serving each request of accessing a selected memory block thereof. Particularly, the bootstrap module is configured by default to have the streaming driver interacting with the remote access server of the source server. Moreover, the bootstrap module is also configured by default for starting its remote access server (comprised in the software image), so that this happens at block 409.

With reference now to block 410, as soon an access request for accessing a selected memory block is submitted to the file-system driver (for loading the remote access driver at the beginning and for operating the main virtual machine later on), the request is passed to the streaming driver. The flow of activity then branches at block 411 according to a mode of the access request; particularly, the blocks 412-418 are executed if the access request is for reading the selected memory block, whereas the blocks 419-422 are executed if the access request is for writing the selected memory block.

Considering now the block 412 (reading access request), a test is made to verify whether the selected memory block is accessed for the first time (in general) in the main virtual machine (as indicated in the mapping table). If so (i.e., when the accessed flag of the selected memory block is deasserted) the streaming driver passes the access request to the remote access driver; in turn, the remote access driver (acting as an iSCSI initiator in the example at issue) submits a corresponding download request to the remote access server of the source server at block 413. Continuing to block 414, the remote access server of the source server downloads the selected memory block onto the main virtual machine. The streaming driver at block 415 stores the selected memory block (received from the remote access driver) into the virtual disk. The streaming driver at block 416 then updates the mapping table by asserting the corresponding accessed flag. Referring again to the block 412, conversely (i.e., when the accessed flag of the selected memory block is asserted) the streaming driver directly reads the selected memory block from the virtual disk at block 417. In both cases, the method 400 then passes to block 418 (either from the block 416 or from the block 417), wherein the streaming driver returns the selected memory block to the file-system driver, which in turn returns it to its requestor.

Considering instead the block 419 (writing access request), the flow of activity branches according to the implementation of the streaming driver. Particularly, if the streaming driver supports the block repository and the selected memory block has not been updated yet (i.e., its updated flag is deasserted), the method 400 descends into block 420. In this phase, the original copy of the selected memory block is copied from the virtual disk into a first free location of the block repository; at the same time, an address of this location of the block repository is associated with the selected memory block in the mapping table. The method 400 then continues to block 421; the same point is also reached directly from the block 419 when the streaming driver does not support the block repository or the selected memory block has already been updated. In any case, the streaming driver writes the desired value of the selected memory block into the virtual disk (by either storing it for the first time or changing its previous version). The streaming driver at block 422 then updates the mapping table by asserting the corresponding accessed flag and the corresponding updated flag (if it is necessary).

In both cases, the flow of activity returns to the block 410 (from the block 418 or from the block 422) waiting for any request of accessing a next selected memory block.

Considering instead the block 423 (next deployment of the software image), the target virtual machine is set as a secondary virtual machine for the deployment of the software image (for example, by leaving the corresponding flag of its record in the mapping table deasserted). The flow of activity then branches at block 424 according to the implementation of the streaming driver. Particularly, if the streaming driver does not support the block repository, the deployment manager as above uploads the bootstrap module onto the target server at block 425. Conversely (if the streaming driver supports the block repository), the deployment manager instructs the deployment agent to regenerate the original version of the bootstrap module from the main virtual machine at block 426; for this purpose, each memory block of the bootstrap module is read from its virtual disk (when the corresponding updated flag is deasserted) or it is extracted from its block repository otherwise.

In both cases, the method 400 continues to block 427 (from the block 425 or from the block 426); at this point, the deployment manager instructs the deployment agent to configure the (downloaded or regenerated) bootstrap module to have the streaming driver interacting with the remote access server of the main virtual machine (for the same software image on the same target server, as indicated in the deployment map), and for not starting its remote access server. The deployment manager then instructs the deployment agent to store the memory blocks of the (updated) bootstrap module into the virtual disk of the secondary virtual machine. With reference now to block 428, the deployment manager instructs the deployment agent to turn on the secondary virtual machine.

Moving to block 429 in the swim-lane of the secondary virtual machine, it boots normally from the bootstrap module thereby loading the corresponding portion of the guest operating system and the streaming driver with its mapping table (initialized as above), which again overrides the standard file-system driver of the guest operating system for serving each request of accessing a (further) selected memory block of the target virtual disk.

With reference now to block 430, as soon an access request for accessing a selected memory block is submitted to the file-system driver (for operating the secondary virtual machine), as above the request is passed to the streaming driver. The flow of activity then branches at block 431 according to a mode of the access request; particularly, the blocks 432-444 are executed if the access request is for reading the selected memory block, whereas the blocks 445-448 are executed if the access request is for writing the selected memory block.

Considering now the block 432 (reading access request), a test is made to verify whether the selected memory block is accessed for the first time (in general) in the secondary virtual machine (as indicated in the mapping table). If so (i.e., when the accessed flag of the selected memory block is deasserted) the streaming driver passes the access request to the remote access driver; in turn, the remote access driver (again acting as an iSCSI initiator) submits a corresponding retrieval request to the remote access server of the main virtual machine at block 433.

Moving to the swim-lane of the main virtual machine, the streaming driver (receiving the retrieval request from the remote access server) performs a test at block 434 to verify whether the selected memory block has been updated in the main virtual machine (as indicated in the mapping table). If so (i.e., when the updated flag of the selected memory block is asserted to indicate that the selected memory block has been written before its downloading or its has been changed after it), the flow of activity branches at block 435 according to the implementation of the streaming driver. Particularly, if the streaming driver does not support the block repository the method 400 descends into block 436; in this phase, the streaming driver passes the access request to the remote access driver, which in turn submits a corresponding download request to the remote access server of the source server. Continuing to block 437, the remote access server of the source server downloads the selected memory block onto the main virtual machine. Referring again to the block 435, conversely (i.e., when the main streaming driver supports the block repository) the streaming driver at block 438 directly extracts the original version of the selected memory block from the location of the block repository indicated in the mapping table. Returning instead to the block 434, when the selected memory block has not been updated in the main virtual machine (i.e., its updated flag is deasserted), the method 400 descends into block 439; in this phase, the selected memory block is read on the main virtual machine by repeating the same operations described above (i.e., downloading the selected memory block from the source server and storing it into the virtual disk when it is accessed for the first time, or reading the selected memory block from the virtual disk otherwise). In any case, the method 400 merges again at block 440 (from the block 437, the block 438 or the block 439), wherein the streaming driver passes the selected memory block to the remote access server, which in turns returns it to the remote access driver of the secondary virtual machine. Going back to the swim-lane of the secondary virtual machine, the streaming driver at block 441 stores the selected memory block (received from the remote access driver) into the virtual disk. The streaming driver at block 442 then updates the mapping table by asserting the corresponding accessed flag.

Referring again to the block 432, when the selected memory block has already been accessed in the secondary virtual machine (i.e., its accessed flag is asserted) the streaming driver directly reads the selected memory block from the target virtual disk at block 443.

In both cases, the method 400 then passes to block 444 (either from the block 442 or from the block 443), wherein the streaming driver returns the selected memory block to the file-system driver, which in turn returns it to its requestor.

Considering instead the block 445 (writing access request), exactly the same operations described above with reference to the blocks 419-422 are executed at blocks 445-448 (so that their explanation is not repeated).

In both cases, the flow of activity returns to the block 430 (from the block 444 or from the block 448) waiting for any request of accessing a next selected memory block.

In a completely asynchronous way, the system administrator at block 449 in the swim-lane of the source server selects one of the target virtual machines (hereinafter referred to as old virtual machine) wherein a corresponding software image has been previously deployed, at least in part (as indicated in the deployment map) for its removal through the deployment manager. In response thereto, a test is made at block 450 to verify the type of the old virtual machine (as indicated in the deployment map). Particularly, if the old virtual machine is the main virtual machine on the corresponding target server for its software image, the method 400 passes to block 451; in this phase, another test is made to verify the number of secondary virtual machines for this software image on the same target server (as indicated in the deployment map). If one or more secondary virtual machines for the software image are available on the target server, one of them is selected at block 452 (to become the new main virtual machine in place of the old virtual machine); particularly, the selected secondary target virtual machine is the oldest one of the target server on which the software image has been deployed (at least in part). In this way, the selected secondary virtual machine is likely to have the highest number of memory blocks already stored in its virtual disk. Continuing to block 453, the selected secondary virtual machine is now set as the new main virtual machine for the software image on the target server (by asserting the corresponding flag of its record in the mapping table). The deployment manager then instructs the deployment agent to configure the bootstrap module in the new main virtual machine to have the streaming driver interacting with the remote access server of the source server, and for starting its remote access server at block 554. The deployment manager then instructs the deployment agent to start the remote access server of the new main virtual machine at block 455. Moreover, the deployment manager instructs the deployment agent to configure the bootstrap module of the other secondary virtual machines, if any (as indicated in the deployment map) to have their streaming driver interacting with the remote access server of the new main virtual machine at block 456.

The method 400 then continues to block 457 in the swim-lane of the source server; the same point is also reached directly from the block 450 (when the old virtual machine is not the main virtual machine on the target server for the software image) or from the block 451 (when the old virtual machine is the main virtual machine on the target server for the software image, but no secondary virtual machine is available on the target server for the same software image). In any case, the deployment manager instructs the deployment agent to turn off and remove the old virtual machine from the target server; at the same time, the corresponding record is deleted from the deployment map.

The method 400 then ends at the concentric white/black stop circles 458.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the invention provides a method for deploying a software image (of any type—for example, only comprising the operating system without any application programs) from a source data-processing system (of any type, see below) on a plurality of target data-processing entities (in any number and of any type, see below) of a target data-processing system (of any type, see below). The software image comprises a plurality of memory blocks (in any number and of any size), which are individually accessible; a predefined subset of the memory blocks (in any number and at any location) defines a bootstrap module (for any operating system and of any type—for example, comprising the MBR including the GRBU boot loader, the /boot directory including the kernel and the initrd file system in Linux—trademark of Linus Torvalds). The method comprises the following steps. The bootstrap module is downloaded onto a main one of the target data-processing entities from the source data-processing system (in any way). The main target data-processing entity is booted from the bootstrap module, thereby loading a streaming driver comprised in the bootstrap module. Each request of accessing a selected memory block of the software image on the main data-processing entity is server by the streaming driver; the streaming driver downloads the selected memory block from the source data-processing system and stores the selected memory block into the main target data-processing entity in response to a first one of the requests of accessing the selected memory block; the streaming driver instead accesses the selected memory block in the main target data-processing entity otherwise. The bootstrap module is also provided to each one of a set of (one or more) secondary ones of the target data-processing entities (in any way—for example, downloading it from the source data-processing system, copying it from another target data-processing entity, or regenerating it locally). Each secondary target data-processing entity is booted from the bootstrap module, thereby loading the streaming driver. Each request of accessing a further selected memory block of the software image on the secondary data-processing entity is served by the streaming driver. The streaming driver retrieves the further selected memory block from the main target data-processing entity and stores the further selected memory block into the secondary target data-processing entity in response to a first one of the requests of accessing the further selected memory block; the streaming driver instead accesses the further selected memory block in the secondary target data-processing entity otherwise.

However, the same solution may be implemented with an equivalent method (by using similar steps with the same functions of more steps or portions thereof, removing some steps being non-essential, or adding further optional steps); moreover, the steps may be performed in a different order, concurrently or in an interleaved way (at least in part). For example, it is possible to download the memory blocks from the source data-processing system onto the main target data-processing entity and/or retrieve the memory blocks from the main target data-processing entity by the secondary target data-processing entities in the background (for example, when a corresponding workload is low); moreover, it is also possible to disable the streaming driver when all the memory blocks of the software image have been stored in the corresponding target data-processing entity.

In an embodiment of the invention, the target data-processing entities are target virtual machines hosted on the target data-processing system.

However, the virtual machines may be implemented in any other way (for example, under the control of a hypervisor directly running on the hardware of the target server); in any case, the application of the same method to physical machines (for example, computers of a same data-processing center being remote from the source server) is not excluded.

In an embodiment of the invention, the step of booting the main target data-processing entity comprises starting an access server comprised in the software image on the main data-processing entity. The step of serving each request of accessing a further selected memory block comprises submitting a request of retrieving the further selected memory block by the streaming driver of the secondary data-processing entity to the access server of the main data-processing entity in response to the first request of accessing the further selected memory block, and returning the further selected memory block from the access server of the main data-processing entity to the streaming driver of the secondary data-processing entity.

However, the access server may of any other type (for example, based on the AoE protocol); in any case, the memory blocks may be retrieved from the main target data-processing entity by the secondary data-processing entities in any way (for example, by means of a dedicated service).

In an embodiment of the invention, the step of downloading the bootstrap module onto a main one of the target data-processing entities comprises configuring the streaming driver for downloading each selected memory block from the source data-processing system in response to the first request of accessing the selected memory block; the step of providing the bootstrap module to each one of a set of secondary ones of the target data-processing entities comprises configuring the streaming driver for retrieving each further selected memory block from the main target data-processing entity in response to the first request of accessing the further selected memory block.

However, the bootstrap module may be configured in any way (for example, with the opposite or no default behavior); in any case, the possibility of having two different bootstrap modules (for the main target data-processing entity and for the secondary target data-processing entities) is not excluded.

In an embodiment of the invention, the method further comprises the following steps. A first one of the target data-processing entities is provided for a first deployment of the software image on the target data-processing system. The first target data-processing entity is set as the main target data-processing entity. A set of (one or more) next ones of the target data-processing entities is provided for a next deployment of the software image on the target data-processing system. Each next target data-processing entity is set as a secondary target data-processing entity.

However, the main and secondary target data-processing entities may be selected in a different way (for example, dynamically according to the corresponding number of memory blocks that are stored therein).

In an embodiment of the invention, the method further comprises the following steps. A request of removing the main target data-processing entity from the target data-processing system is received. One of the secondary target data-processing entities is selected. The selected secondary target data-processing entity is set as a new main target data-processing entity. The main target data-processing entity is removed from the target data-processing system.

However, a basic implementation wherein the main target data-processing entity cannot be changed dynamically is contemplated.

In an embodiment of the invention, the step of selecting one of the secondary target data-processing entities comprises selecting the oldest one of the secondary target data-processing entities.

However, the selection of the secondary target data-processing entities may be based on any other additional or alternative criteria (for example, the number of memory blocks that are stored therein).

In an embodiment of the invention, the step of serving each request of accessing a selected memory block comprises saving an indication of each selected memory block that has been updated in the main target data-processing entity; the step of retrieving the further selected memory block from the main target data-processing entity comprises verifying whether the further selected memory block has been updated in the main virtual machine, and downloading the further selected memory block onto the main data-processing entity from the source data-processing system when the further selected memory block has been updated in the main virtual machine or reading the further selected memory block from the main target data-processing entity otherwise.

However, the information about the updated memory blocks may be provided in any other way (for example, with a separate list of the updated memory blocks); in any case, a basic implementation wherein the software image cannot be updated in the target data-processing entities is not excluded.

In an embodiment of the invention, the step of serving each request of accessing a further selected memory block comprises saving an indication of each further selected memory block that has been updated in the secondary target data-processing entity.

However, this information may be collected only on the main target data-processing entity (for example, when it cannot be changed dynamically).

In an embodiment of the invention, the step of serving each request of accessing a selected memory block comprises saving an original version of each selected memory block that has been updated in the main target data-processing entity. The step of retrieving the further selected memory block from the main target data-processing entity comprises verifying whether the further selected memory block has been updated in the main virtual machine, and returning the further selected memory block when the further selected memory block has not been updated in the main target data-processing entity or the original version thereof otherwise.

However, the block repository may have any structure (for example, storing a copy of the whole portion of the software image that has already been downloaded), and it may also be used for creating any new secondary target data-processing entity.

In an embodiment of the invention, the step of serving each request of accessing a further selected memory block comprises saving an original version of each further selected memory block that has been updated in the secondary target data-processing entity.

However, this operation may be performed only on the main target data-processing entity (for example, when it cannot be changed dynamically).

An embodiment of the invention provides a computer program, which comprises code means for causing a data-processing system (for example, each one of the target servers, the source server or the whole deployment infrastructure) to perform the steps of the proposed method when the computer program is executed on the system.

However, the program may simply consist of each one the software images, or it may be implemented as a stand-alone module, as a plug-in for the deployment manager, or even directly in the deployment manager itself. In any case, similar considerations apply if the program is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the data-processing system to perform the desired operations; particularly, the program may be in the form of external or resident software, firmware, or microcode (either in object code or in source code—for example, to be compiled or interpreted). Moreover, it is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are hard-disks (where the program may be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed or otherwise configured.

An embodiment of the invention provides a data-processing system, which comprises means for performing the steps of the same method (for example, each one of the target servers, the source server or the whole deployment infrastructure).

However, similar considerations apply if the data-processing system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. More specifically, the same method may also be carried out on a data-processing system based on a different architecture (for example, a local, wide area, global, cellular or satellite network), exploiting any type of (wired and/or wireless) connections, or even of the stand-alone type. In any case, the data-processing system may have another structure or may comprise similar elements (such as cache memories temporarily storing the programs or parts thereof); moreover, it is possible to replace the data-processing system with any code execution entity, either based on a physical machine or a virtual machine (such as a PDA, a mobile phone, and the like), or with a combination of multiple entities (such as a multi-tier architecture, a grid computing infrastructure, and the like).

The invention claimed is:

1. A computer program product for deploying a software image from a source data-processing system onto a plurality of target data-processing entities of a target data-processing system, the software image comprising a plurality of memory blocks being individually accessible, with a predefined subset of the memory blocks defining a bootstrap module, the computer program product comprising:
a computer readable storage medium having computer readable program code embodied therewith, the computer readable program code comprising:
computer readable program code configured to download the bootstrap module onto a main one of the target data-processing entities from the source data-processing system;
computer readable program code configured to boot the main target data-processing entity from the bootstrap module thereby loading a streaming driver comprised in the bootstrap module;
computer readable program code configured to serve each request of accessing a selected memory block of the software image on the main data-processing entity by the streaming driver, the streaming driver downloading the selected memory block from the source data-processing system and storing the selected memory block into the main target data-processing entity in response to a first one of the requests of accessing the selected memory block, or accessing the selected memory block in the main target data-processing entity otherwise;
computer readable program code configured to provide the bootstrap module to each one of a set of secondary ones of the target data-processing entities;
computer readable program code configured to boot each secondary target data-processing entity from the bootstrap module thereby loading the streaming driver; and
computer readable program code configured to serve each request of accessing a further selected memory block of the software image on the secondary data-processing entity by the streaming driver, the streaming driver retrieving the further selected memory block from the main target data-processing entity and storing the further selected memory block into the secondary target data-processing entity in response to a first one of the requests of accessing the further selected memory block, or accessing the further selected memory block in the secondary target data-processing entity otherwise.

2. The computer program product according to claim 1, wherein the target data-processing entities are target virtual machines hosted on the target data-processing system.

3. The computer program product according to claim 1, wherein the computer readable program code configured to boot the main target data-processing entity comprises:

computer readable program code configured to start an access server comprised in the software image on the main data-processing entity, wherein the computer readable program code configured to serve each request of accessing a further selected memory block comprises:
  computer readable program code configured to submit a request of retrieving the further selected memory block by the streaming driver of the secondary data-processing entity to the access server of the main data-processing entity in response to the first request of accessing the further selected memory block; and
  computer readable program code configured to return the further selected memory block from the access server of the main data-processing entity to the streaming driver of the secondary data-processing entity.

4. The computer program product according to claim 3, wherein the computer readable program code configured to download the bootstrap module onto a main one of the target data-processing entities comprises:
  computer readable program code configured to configure the streaming driver for downloading each selected memory block from the source data-processing system in response to the first request of accessing the selected memory block; and
  wherein the computer readable program code configured to provide the bootstrap module to each one of a set of secondary ones of the target data-processing entities comprises computer readable program code configured to configure the streaming driver for retrieving each further selected memory block from the main target data-processing entity in response to the first request of accessing the further selected memory block.

5. The computer program product according to claim 1, wherein the computer readable program code further comprises:
  computer readable code configured to provide a first one of the target data-processing entities for a first deployment of the software image on the target data-processing system;
  computer readable code configured to set the first target data-processing entity as the main target data-processing entity;
  computer readable code configured to provide a set of next ones of the target data-processing entities for a next deployment of the software image on the target data-processing system; and
  computer readable code configured to set each next target data-processing entity as a secondary target data-processing entity.

6. A data-processing system comprising:
  one or more processors;
  a memory coupled to at least one of the processors;
  a set of computer program instructions stored in the memory and executed by at least one of the processors to deploy a software image from a source data-processing system onto a plurality of target data-processing entities of a target data-processing system, the software image comprising a plurality of memory blocks being individually accessible, with a predefined subset of the memory blocks defining a bootstrap module, wherein the deploying comprises:
    downloading the bootstrap module onto a main one of the target data-processing entities from the source data-processing system;
    booting the main target data-processing entity from the bootstrap module thereby loading a streaming driver comprised in the bootstrap module;
    serving each request of accessing a selected memory block of the software image on the main data-processing entity by the streaming driver, the streaming driver downloading the selected memory block from the source data-processing system and storing the selected memory block into the main target data-processing entity in response to a first one of the requests of accessing the selected memory block, or accessing the selected memory block in the main target data-processing entity otherwise;
    providing the bootstrap module to each one of a set of secondary ones of the target data-processing entities;
    booting each secondary target data-processing entity from the bootstrap module thereby loading the streaming driver; and
    serving each request of accessing a further selected memory block of the software image on the secondary data-processing entity by the streaming driver, the streaming driver retrieving the further selected memory block from the main target data-processing entity and storing the further selected memory block into the secondary target data-processing entity in response to a first one of the requests of accessing the further selected memory block, or accessing the further selected memory block in the secondary target data-processing entity otherwise.

7. The data-processing system according to claim 6, wherein the target data-processing entities are target virtual machines hosted on the target data-processing system.

8. The data processing system according to claim 6, wherein booting the main target data-processing entity comprises:
  starting an access server comprised in the software image on the main data-processing entity, wherein serving each request of accessing a further selected memory block comprises:
    submitting a request of retrieving the further selected memory block by the streaming driver of the secondary data-processing entity to the access server of the main data-processing entity in response to the first request of accessing the further selected memory block; and
    returning the further selected memory block from the access server of the main data-processing entity to the streaming driver of the secondary data-processing entity.

9. The data processing system according to claim 8, wherein downloading the bootstrap module onto a main one of the target data-processing entities comprises:
  configuring the streaming driver for downloading each selected memory block from the source data-processing system in response to the first request of accessing the selected memory block; and
  wherein providing the bootstrap module to each one of a set of secondary ones of the target data-processing entities comprises configuring the streaming driver for retrieving each further selected memory block from the main target data-processing entity in response to the first request of accessing the further selected memory block.

* * * * *